(12) United States Patent
Normann et al.

(10) Patent No.: US 11,594,114 B2
(45) Date of Patent: Feb. 28, 2023

(54) COMPUTER-IMPLEMENTED METHOD, COMPUTER PROGRAM AND APPARATUS FOR GENERATING A VIDEO STREAM RECOMMENDATION

(71) Applicant: Milestone Systems A/S, Broendby (DK)

(72) Inventors: Mathias Normann, Vallensbaek Strand (DK); Tong Su, Copenhagen (DK)

(73) Assignee: Milestone Systems A/S, Brøndby (DK)

( * ) Notice: Subject to any disclaimer, the term of this patent is extended or adjusted under 35 U.S.C. 154(b) by 248 days.

(21) Appl. No.: 17/136,808

(22) Filed: Dec. 29, 2020

(65) Prior Publication Data

US 2022/0207971 A1    Jun. 30, 2022

(51) Int. Cl.
   *G06F 16/732*   (2019.01)
   *G08B 13/196*   (2006.01)
   *G06N 5/02*     (2023.01)

(52) U.S. Cl.
   CPC ... *G08B 13/19645* (2013.01); *G06F 16/7328* (2019.01); *G06F 16/7335* (2019.01); *G06N 5/02* (2013.01); *G08B 13/19641* (2013.01)

(58) Field of Classification Search
   USPC ...................................................... 348/143
   See application file for complete search history.

(56) References Cited

U.S. PATENT DOCUMENTS

| | | | |
|---|---|---|---|
| 11,481,603 B1* | 10/2022 | Newman | G06N 3/08 |
| 2022/0051665 A1* | 2/2022 | Bade | G06F 16/284 |
| 2022/0129770 A1* | 4/2022 | Mihindukulasooriya | G06F 16/9024 |
| 2022/0138170 A1* | 5/2022 | Misiewicz | G06N 3/0454 707/737 |
| 2022/0147547 A1* | 5/2022 | Kwatra | G06F 16/337 |
| 2022/0164680 A1* | 5/2022 | Ravizza | G06N 5/022 |
| 2022/0179857 A1* | 6/2022 | Kompella | G06N 5/02 |
| 2022/0198211 A1* | 6/2022 | Ferreira Moreno | G06V 20/46 |

FOREIGN PATENT DOCUMENTS

JP    2013051486 A    3/2013

OTHER PUBLICATIONS

Barry Norton, Knowledge Graphs and Milestone, Milestone, Oct. 8, 2019, https://www.slideshare.net/BarryNorton/knowledge-graphs-and-milestone.

* cited by examiner

*Primary Examiner* — Nigar Chowdhury
(74) *Attorney, Agent, or Firm* — Canon U.S.A., Inc. IP Division (57) ABSTRACT

A computer-implemented method of generating a video stream recommendation comprises identifying a plurality of peripheral devices monitoring zones of a physical area, the peripheral devices comprising a plurality of video cameras providing video streams of at least some of the monitored zones. The method further comprises querying a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the querying. The method then comprises generating a video stream recommendation based on the result of the querying.

20 Claims, 4 Drawing Sheets

COMPUTER-IMPLEMENTED METHOD, COMPUTER PROGRAM AND APPARATUS FOR GENERATING A VIDEO STREAM RECOMMENDATION

BACKGROUND

The present disclosure relates to a computer-implemented method, a computer program and an apparatus for generating a video stream recommendation.

A video surveillance management system typically receives video data from a plurality of surveillance cameras. The video surveillance management system may store the data in a recording server and carry out image processing or analytics, and transmit the video data to a client device which may be a mobile device or an operator console including a display where it is viewed by an operator. The video surveillance management system may also carry out control relating to the storage and deletion of the video data.

The video surveillance management system may also receive commands from the user, from the client device. The commands may include commands to remotely control video cameras connected to the video surveillance management system such as pan-tilt-zoom (PTZ) video cameras. The commands may also include commands to the video management system which control which data is sent to the client device for display. For example, the operator can control which video cameras' data is sent from the video management system to the display so that the operator can select which video cameras to view data from.

The operator's display may display only data from one video camera at any one time. However, video data from multiple cameras may be displayed simultaneously in multiple windows of an interface (e.g. in multiple panes or child windows inside a parent window), with video from a selected camera preferably displayed in a relatively larger view than the other cameras. Accordingly, the client device can receive one stream of video data or multiple streams.

Video surveillance is often carried out in real time, with an operator monitoring events as they happen. In some cases, it is crucial that the operator maintains a clear view of a moving object or activity of interest continuously. When such an object or activity is detected in a monitored zone of a physical area, an operator may want to continue observing the object or activity after it has reached and/or spread out across other monitored zones. For instance, when a thief is detected in a monitored zone, there is a need to know which relevant video cameras monitoring zones of the physical area would provide video streams in which the thief might be predicted to appear in after leaving the monitored zone in which the thief was detected. This issue becomes even more complicated as the number of video cameras increases in the physical area under surveillance. In some cases, the user may only be watching a limited number of video streams on a display, e.g. eight or nine video streams, while the number of video cameras in the physical area can exceed several tens of video cameras and in some cases even more than a thousand video cameras. Even though the number of video cameras may be high, there may be dead zones or blind spots in the physical area where there is no camera coverage, i.e. zones which are not in any camera's field of view. Even if the thief enters a closed corridor with no alternative route, the operator might feel insecure about his/her next choice of video camera if the thief does not appear as quickly as expected in the field of view of the video camera which has been selected next by the operator. This is particularly the case for operators which are unfamiliar with the physical area and its distances, e.g. for operators in a remote surveillance centre. The relevant video cameras may also not be currently displayed to the operator and he/she may have to search for them, for instance in a hierarchical tree list. The time required for the search will depend, in particular, on the operator's knowledge of the list, e.g. a less experienced operator will probably need more time to find the relevant video cameras. By the time the operator finds and selects one or more video cameras providing video streams of monitored zones which neighbour a monitored zone where the moving object or activity of interest was detected, the object or activity may have already moved beyond these neighbouring zones such that the operator loses track of it. The issue is aggravated by the time taken to load video streams. Moreover, if the operator loses track of the object or activity e.g. when monitoring a large crowd of people and several alternative routes can be taken by the object or activity, it is almost impossible to relocate it when having to check individual camera streams from different locations where the object or activity could potentially have passed through at different times. In summary, the operator may lose valuable time searching and loading relevant video streams while being without sight of the object or activity during all this time, and may ultimately lose track of the object or activity.

Thus, there is a need to facilitate quick identification of relevant video streams which are likely to show a moving object or activity of interest once it has departed or spread from a selected monitored zone.

It is known from Japanese Patent Application Publication No. JP2013051486A to rank video cameras according to different filters, i.e. by prioritizing a video camera that covers the more areas, by prioritizing a video camera that covers the most distant area, by prioritizing a video camera that can evenly monitor the entire surveillance area and by prioritizing video cameras that are sufficiently distant to evenly monitor the entire surveillance area. These rankings are determined based on a model of the physical area in the form of a graph (FIG. 3) and a table (FIG. 4) representing the video cameras as connected to the zones the video cameras belong to and observe. For instance, the first three video cameras C1, C2, C3 observe a front cabinet in a machine room on a second floor of a second building and a camera C14 observes a west side of a corridor on the same floor in the same building. However, this model does not explicitly reflect the possibility of movement (such as human movement) or reachability between the different zones of the physical area, and whether and how the different rooms (e.g. the said machine room and corridor) and floors are connected with one another by any means of passage (e.g. via a doorway). It is thus not possible to determine which video cameras would provide video streams in which a person might be predicted to appear after leaving the said machine room or corridor or when going to another floor. In summary, the aforementioned graph and table have no predictive value for determining relevant cameras for tracking purposes across different rooms and/or floors.

It is also known to find relevant video cameras based on a Euclidean distance, i.e. by ranking the video cameras based on a radius from the video camera with which an operator observes an incident. However, such a solution does not consider reachability by an object (such as a human person or a car) causing the incident as it will include all video cameras which are within a predetermined radius, including video cameras monitoring zones of a physical area the object cannot access. For instance, two video cameras located on and looking at opposite sides of a motorway would appear to be close based on a Euclidean distance but would not be both able to capture the same car one after the other. Thus, one of the two video cameras is not relevant for further observing the car after it leaves the field of view of the video camera which captured it in the first place.

BRIEF SUMMARY

The present disclosure provides a computer-implemented method of generating a video stream recommendation identifying a plurality of peripheral devices monitoring zones of a physical area, the peripheral devices comprising a plurality of video cameras providing video streams of at least some of the monitored zones; querying a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the querying; generating a video stream recommendation based on the result of the querying.

BRIEF DESCRIPTION OF THE DRAWINGS

Embodiments of the present disclosure will now be described, by way of example only, with reference to the accompanying drawings in which.

DETAILED DESCRIPTION

Figure 1:
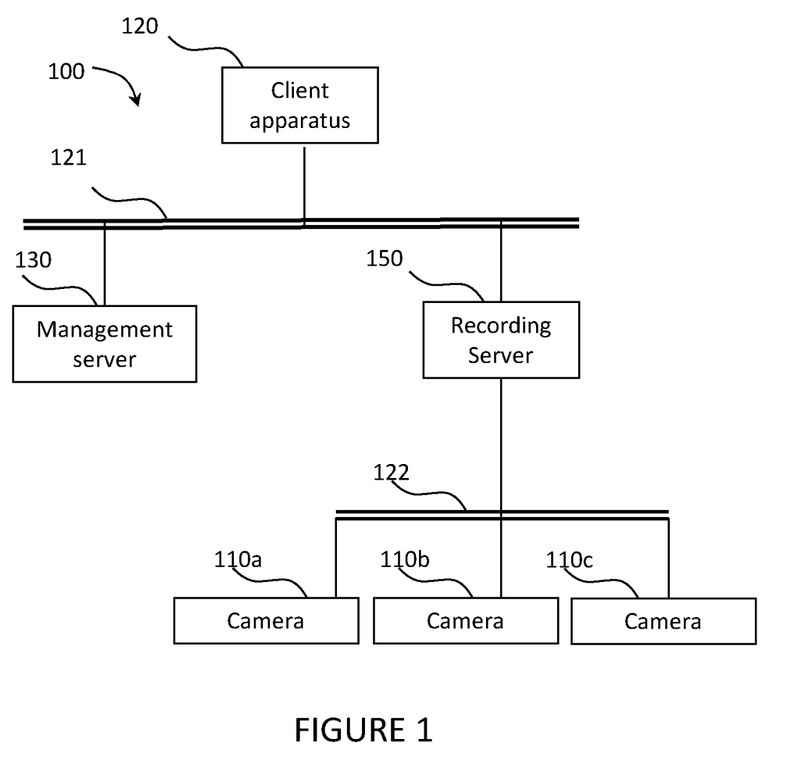
FIG. 1 illustrates an example of a video surveillance system implementing the present disclosure.

FIG. 1 shows an example of a video surveillance management system 100 in which embodiments of the present disclosure can be implemented. The system 100 comprises a management server 130 and a recording server 150. Further servers may also be included, such as further recording servers, archive servers, indexing servers or analytics servers. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. Also, a mobile server (not illustrated) may be provided to allow access to the surveillance/monitoring system from mobile devices, such as a mobile phone hosting a mobile client or a laptop accessing the system from a browser using a web client. An analytics server can also run analytics software for image analysis, for example motion or object detection, facial recognition, event detection.

A plurality of video surveillance cameras 110a, 110b, 110c send video data to the recording server 150. An operator client 120 provides an interface via which an operator can view live video streams from the video cameras 110a, 110b, 110c, or recorded video data from the recording server 150. The video cameras 110a, 110b, 110c capture image data and send this to the recording server 150 as a plurality of video streams. The recording server 150 stores the video streams captured by the video cameras 110a, 110b, 110c.

According to one variant of the present disclosure, the fields of view of at least some of the video cameras overlap, thus allowing to monitor some parts of the physical area under surveillance from different directions. According to another variant of the present disclosure, none of the fields of view of the video cameras overlap, thus allowing to monitor a larger portion of the physical area under surveillance.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the video cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

The operator client 120 is provided for use by an operator (such as a security guard or other user) in order to monitor or review the outputs of the video cameras 110a, 110b, 110c. The operator client 120 may be a fixed console or could be a mobile device connected to the video management system via a network. The operator client 120 includes a display which can display an interface for interacting with the management software on the management server 130. The operator client 120 can request video data streams from one or more of the video cameras 110a, 110b, 110c to view video streams in real time, or the operator client 120 can request recorded video data stored in the recording server 150. According to a preferred embodiment of the present disclosure, the video being captured by one of the video cameras as a selected video stream is displayed in a main window, with video streams captured by other video cameras being displayed in smaller windows. In this case, multiple video streams are sent to the operator client 120. In the case of a system with a large number of cameras, even a large display may not be able to show the videos from all of the video cameras, only a selection. Alternatively, the operator client 120 may be arranged to show the video stream being captured by only one of the video cameras 110a, 110b, 110c as a selected video stream on its display. In this case, only one video stream is sent to the operator client 120, this being the stream from the selected camera.

The operator client may also be connected with an incident response system that can receive commands from the operator to remotely close doors, set or change access control rights, prevent or allow access to certain zones of the physical area, set traffic lights, trigger an alarm or control any devices configured to be remotely controlled via the incident response system. Note that the commands can be security related, emergency related or operations related.

The operator client 120 is configured to communicate via a first network/bus 121 with the management server 130 and the recording server 150 and the video cameras 110*a*, 110*b*, 110*c*. The recording server 150 communicates with the video cameras 110*a*, 110*b*, 110*c* via a second network/bus 122. The recording server 150 is configured so as to stream video streams from the video cameras 110*a*, 110*b*, 110*c* to the operator client 120.

The video surveillance system of FIG. 1 is an example of a system in which the present disclosure can be implemented. However, other architectures are possible. For example, the system of FIG. 1 is an "on premises" system, but the present disclosure can also be implemented in a cloud-based system. In a cloud-based system, the video cameras stream data to the cloud, and at least the recording server 150 is in the cloud. Additionally, video analytics may be carried out in the cloud. The client apparatus requests the video data to be viewed by the user from the cloud. The system may also be configured as a hybrid system where, for instance, the data is archived on a cloud-based archive server after having been recorded on an on-premises recording server. Alternatively, an on-premises server may buffer the video data before moving it to a cloud-based recording server.

Figure 2:
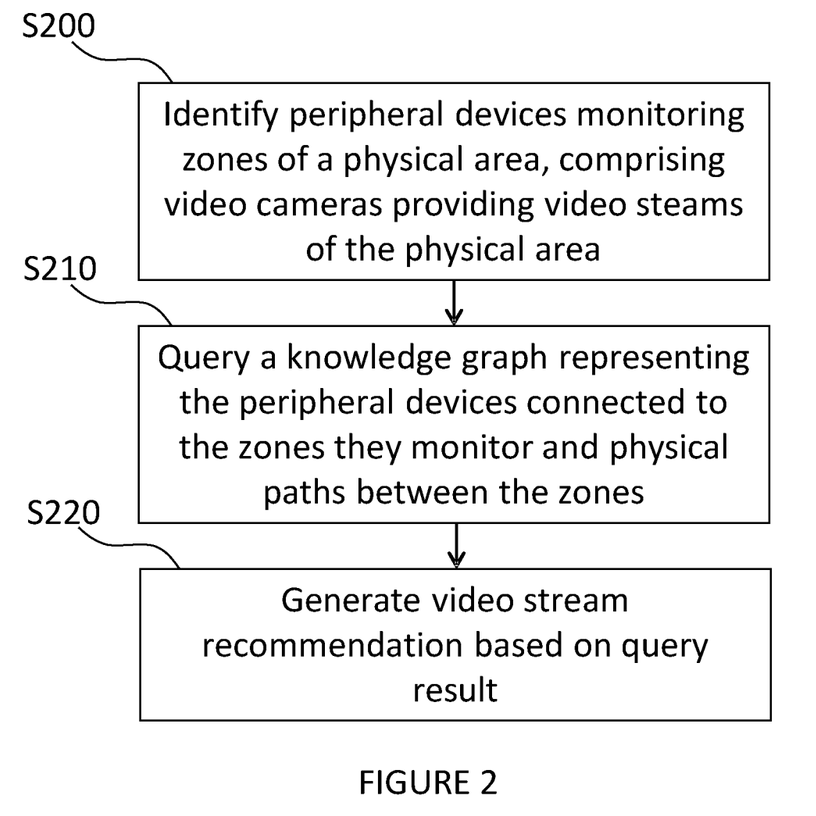
FIG. 2 is a flowchart illustrating the essential steps of the computer-implemented method of generating a video stream recommendation according to the present disclosure.

FIG. 2 is a flowchart illustrating a computer-implemented method according to the present disclosure, which comprises three essential steps. In a first step S200, the computer will identify a plurality of peripheral devices monitoring zones of a physical area, the peripheral devices comprising a plurality of video cameras providing video streams of at least some of the monitored zones. This identification can consist for instance in an exchange of identification parameters between the computer and the peripheral devices or in any exchange of data allowing the computer to identify peripheral devices connected to the computer, either directly or indirectly.

Within the context of the present disclosure, the term "peripheral devices" should be understood as comprising devices for generating monitoring signals and/or data. Typical peripheral devices include video cameras, cameras, audio recording equipment, or the like, traditional measurement or sensing devices, such as sensors for biological, chemical, or physical quantities/parameters, electrical, magnetic or optical sensors, temperature or wind sensors, light detecting sensors, motion detecting sensors such as passive infrared (PIR) sensors, sensors which use microwave or ultrasonic pulses, or vibration sensors, biometric sensors or systems, access control and alarm equipment or systems, door access control equipment or systems, and production process parameter sensors. The present disclosure is not limited to any particular types of peripheral devices but should at least include a plurality of video cameras. Preferably, the peripheral devices comprise a combination of video cameras and other devices such as access control and alarm equipment or systems or door access control equipment or systems.

Note that the peripheral devices do not need to be connected or to communicate with one another and can be connected to the recording server 150 by ethernet cables of via a wireless connection, for instance. Alternatively, the peripheral devices may indirectly be connected to the video surveillance management system or recording server through one or more parallel systems, provided the peripheral devices are visible and/or controllable through the said one or more parallel systems.

Although the present disclosure particularly relates to the field of video surveillance, other typical purposes for monitoring video streams may be documentation, medical observation, building management, production, traffic control and/or process control.

The signals or data streams generated by the peripheral devices can be segmented into data segments of manageable sizes in order to be stored on recording servers. The data streams can then be retrieved from the recording servers for live or playback streaming for viewing and/or analysis at a client side.

Figure 4:
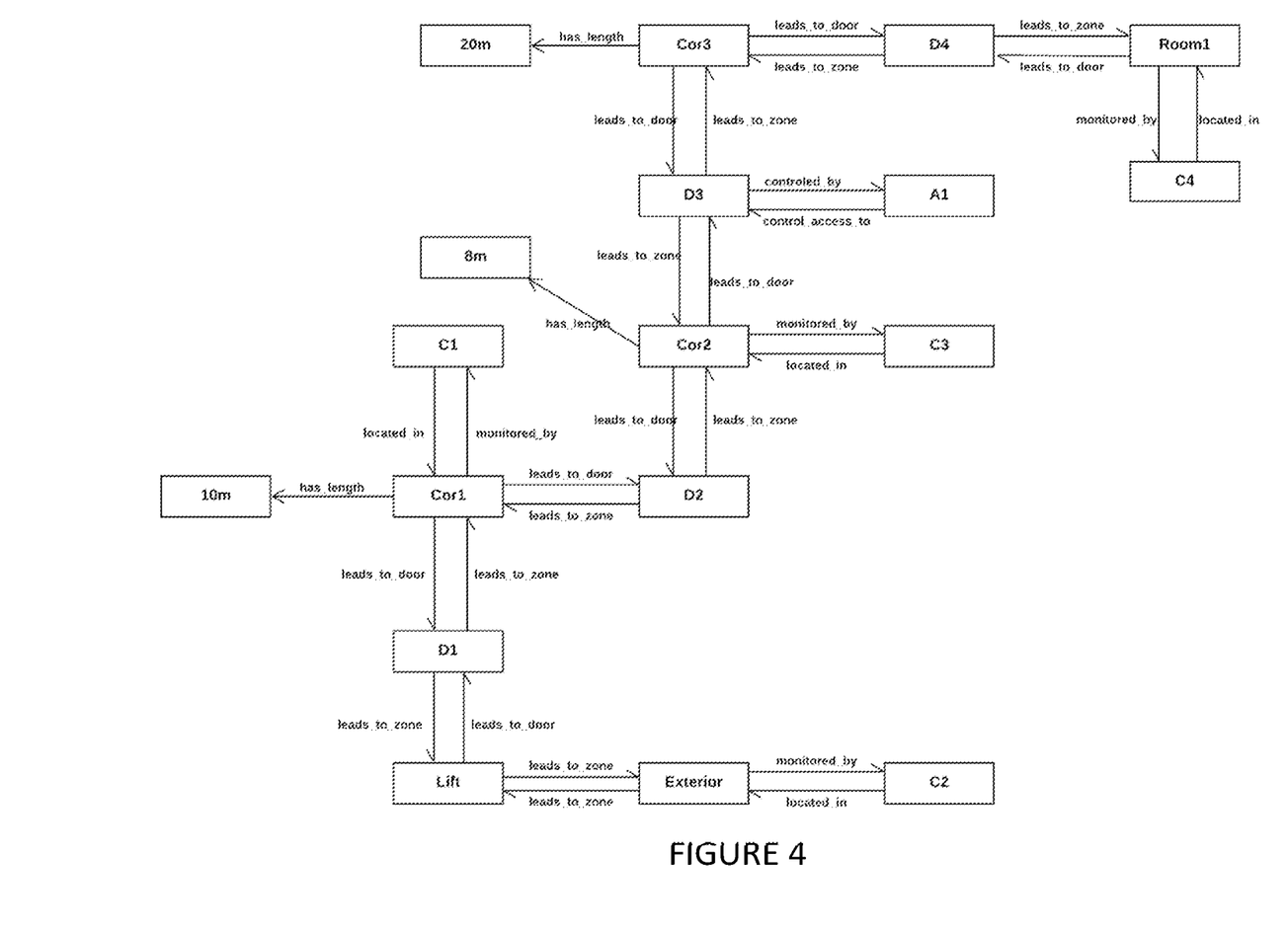
FIG. 4 is an example of a knowledge graph representing the peripheral devices and the monitored zones of FIG. 3 as ontology entities (or nodes) connected by edges representing physical paths between the monitored zones, and by edges representing which monitored zones the peripheral devices monitor.

In a second step S210, the computer will query a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the query. Such a knowledge graph reflects which zones are reachable by an object or activity in the physical area under surveillance. By way of example, such a knowledge graph is illustrated in FIG. 4, which will be described below. Within the context of the present disclosure, the term "monitored zone" should be understood as a part of the physical area that is monitored, e.g. observed by a video camera, controlled by an alarm or any other peripheral device. Accordingly, a monitored zone may correspond to the field of view of a video camera, though not necessarily.

Alternatively, the computer may receive a command from an operator to select the said selected monitored zone by selecting a video stream of it amongst video streams displayed to the operator. For instance, the operator may simply select a zone by clicking on a video stream displayed on his/her display or on a button or selectable icon which corresponds to a monitored zone he/she is interested in. Alternatively, the computer can receive from at least one of the said peripheral devices a signal enabling to select the said selected monitored zone. In this case, the selected monitored zone can preferably be selected automatically by the computer upon receipt of the said signal. For instance, the signal can be sent by an alarm set off by a security tag.

The selected monitored zone will then be used as a starting point to navigate around the knowledge graph and identify a set of one or more video camera(s) monitoring zones which are connected to the selected monitored zone. Preferably, the video camera(s) of the set is or are the video cameras which are topologically closest to the selected monitored zone. Within the context of the present disclosure, "topologically closest" means these video cameras which are closest or immediately adjacent in the knowledge graph in all directions starting from the selected monitored zone, without considering video camera(s) potentially monitoring the selected monitored zone. Note however that the present disclosure is not limited to this identification of the closest neighbouring video camera(s) or video cameras monitoring zones that are immediately adjacent to the selected monitored zone, but that it is advantageous to identify them. The skilled person may choose how many video cameras can be part of the set, based for instance on the number of video cameras monitoring zones connected to the selected monitored zone which have been identified. For instance, the skilled person can choose to limit the maximum number of video cameras in the set to a predetermined number. Alternatively, the maximum number of video cameras in the set can be set as a function of different properties of the physical area under surveillance and/or of different properties pertaining to the peripheral devices.

In a third step S220, the computer will generate a video stream recommendation based on the result of the query of step S210. By way of example, this recommendation can include displaying a list of one or more relevant video cameras with hyperlinks towards their video streams. Alternatively or in addition, this recommendation can include directly displaying or causing to display one or more video streams of the one or more relevant video cameras.

The process described in steps S200 to S220 can advantageously be repeated multiple times in order to follow the moving object or activity of interest in the physical area, but note that it may not be necessary to repeat step S200 if there is no need to update the identification of peripheral devices previously carried out. Accordingly, the operator may select a new monitored zone by selecting a video stream of it amongst video streams from the video stream recommendation. Based on this newly selected zone, it is possible to query the knowledge graph again to identify a new set of one or more video camera(s) monitoring zones other than the newly selected monitored zone. Preferably, the video camera (s) of the new set is or are the video cameras which are topologically closest to the newly selected monitored zone, similarly to what was explained above with regard to the step S210. Similarly, note that the present disclosure is not limited to this and that the skilled person may here again choose to set a maximum number of video cameras that can be part of the new set. Then, in a similar way to step S220, the computer will generate a new video stream recommendation based on the new query result. By way of example, this new recommendation can include displaying a new list of one or more relevant video cameras with hyperlinks towards their video streams. Alternatively or in addition, this new recommendation can include directly displaying or causing to display one or more video streams of the one or more relevant video cameras.

Figure 3:
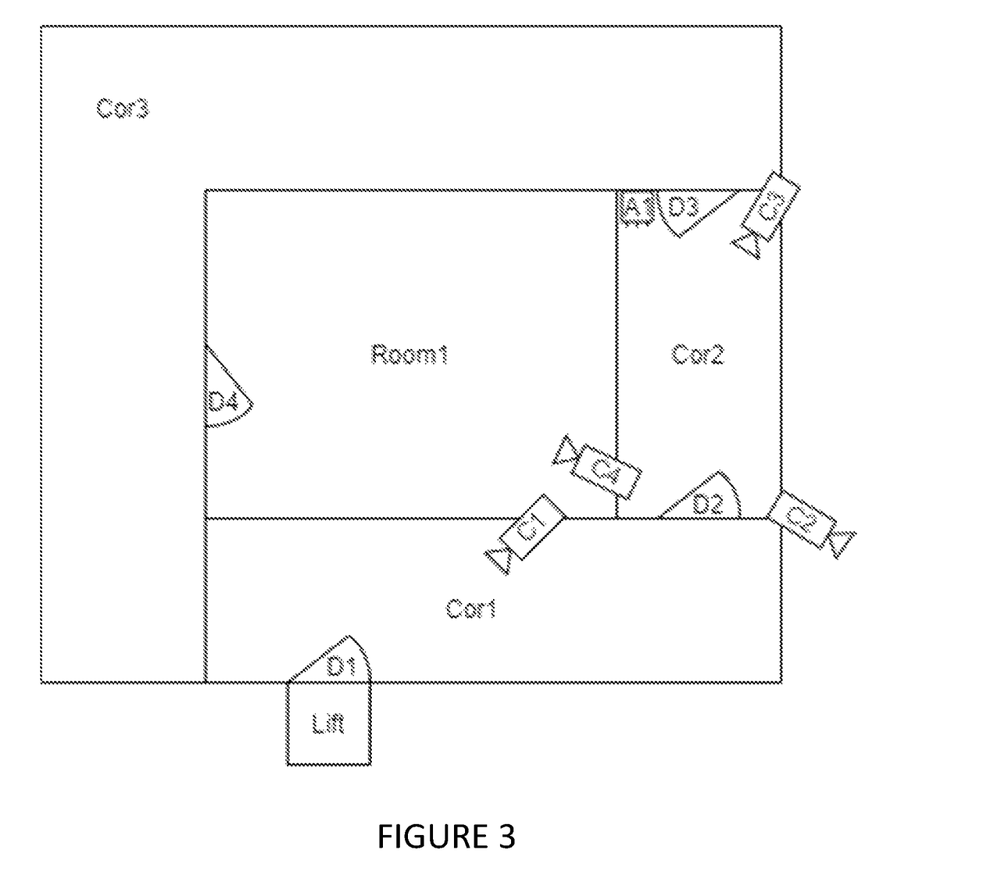
FIG. 3 is an example of a floor plan of a physical area under surveillance showing different peripheral devices monitoring zones of the physical area.

FIG. 3 shows an example of a floor plan where a lift gives access to this specific floor. This floor comprises three corridors Cor1, Cor2, Cor3 and a room Room1, connected by four doors D1, D2, D3, D4, and four cameras C1, C2, C3, C4 belonging to and monitoring different zones of the physical area. As it can be seen, the lift is connected to the corridor Cor1 via the door D1, the corridor Cor1 is connected to the corridor Cor2 via the door D2, the corridor Cor2 is connected to the corridor Cor3 via the door D3, and the corridor Cor3 is connected to the room Room1 via the door D4. The video camera C1 monitors the corridor Cor1 and the openings and closures of the door D1, the video camera C3 monitors the corridor Cor2 and the openings and closures of the door D2, and the video camera C4 monitors the room Room1 and the openings and closures of the door D4. Note that camera C2 is located outside the building and monitors an exterior of the building (e.g. a street) which is connected to the lift. Furthermore, an access control reader A1, which is another peripheral device, is connected to the door D3 to monitor openings and closures of the door D3. Note also that the corridor Cor3 is a non-monitored zone. It can be seen that a moving object or activity of interest could not directly go, for instance, from the lift to the room Room1 without passing through the four doors D1, D2, D3, D4 and the three corridors Cor1, Cor2, Cor3.

Note that this floor plan is only an example and that the present disclosure can be extended to broader physical areas. For instance, a plan of the physical area to be kept under surveillance could be obtained by using a map of the physical area and overlaying it with the peripheral devices on the basis of their GPS coordinates, and combining data representing which zones of the physical area the peripheral devices monitor. For instance, video cameras may be positioned on the basis of their GPS coordinates and respective fields of view determined by known methods (e.g. by using local camera coordinates).

According to the present disclosure, such a plan should then be converted into a knowledge graph, as exemplified with FIG. 4, which represents the peripheral devices and the monitored zones as ontology entities connected by edges representing physical paths between the monitored zones, and by edges representing which monitored zones the peripheral devices monitor.

In the present embodiment, each zone of FIG. 3 is monitored in its entirety, with the exception of the non-monitored corridor Cor3. In other words, there is no blind spot or dead zone within the monitored zones, which can be achieved with the use of PTZ cameras configured to rotate so as to monitor the entirety of the monitored zones they belong to. The knowledge graph of FIG. 4 thus represents the entirety of the monitored zones but also preferably the non-monitored zones which are on the paths between the monitored zones, i.e. here only Cor3.

According to a non-illustrated example, the monitored zones may include blind spots or dead zones. In such a case, it is advantageous to represent these blind spots or dead zones as non-monitored zones in the knowledge graph, because they also impact the speed at which an object and/or activity of interest can move from one video stream to another.

In the present embodiment, the edges are represented as directed edges (unidirectional edges) showing relationships between the monitored zones, non-monitored zones (here only Cor3), peripheral devices and properties thereof.

According to a non-illustrated example, at least some of the edges may be represented as bidirectional edges (double arrows) comprising data and/or metadata representing labels and/or properties associated with both directions of the said bidirectional edges. The data and/or metadata may be represented above, over and/or below the edges. For instance, both edges between the corridor Cor2 and the door D2 could be represented as a single double-headed arrow bearing a single label representing both directions of the relationship, e.g. a "leads_to" label whose name is descriptive of the relationships that edge represents.

According to another non-illustrated example, at least some of the edges may be represented as edges originating from and pointing to a single ontology entity. These edges may also comprise data and/or metadata representing labels and/or properties thereof. For instance an edge comprising a label representing a condition for accessing a zone represented by that ontology entity, e.g. a label which indicates that only security staff can access the zone and reads "security_staff_only". The data and/or metadata may be represented above, over and/or below the edges.

Note that the ontology entities (or nodes) may also comprise data and/or metadata representing labels and/or properties of the monitored and/or non-monitored zones (if any), such as for instance data and/or metadata representing whether a zone is an indoor zone or outdoor zone. The data and/or metadata may be represented above, over and/or below the ontology entities.

Note that the knowledge graph may also be sorted in the form of computer-executable code which represents the said ontology entities and edges. This code may for instance be presented in a format such as XML or JSON, or any other suitable format.

By using such a logical model of the location of the peripheral devices, and how they are related to each other through rooms, doors, corridors (etc.) the most relevant video cameras can be suggested to the operator. Therefore, in the present example, if an operator is viewing a video stream corresponding to the video camera, C4, the video camera C2 will not be suggested as the most relevant camera as it is not logically close to the others, even though it is close when considering an Euclidean distance between the video cameras. The video camera C2 could for instance be suggested as a third recommendation in the video stream recommendation, after the video cameras C3 and C1, or not suggested at all if the maximum number of video cameras in the video stream recommendation is set to one or two.

According to a particular embodiment of the present disclosure, the knowledge graph may include non-monitored zones of the physical area as ontology entities connected by edges, the said non-monitored zones being part of the said possible path, such as for instance the corridor C3 in FIG. 4. In this way, the non-monitored zone(s) can also be considered for determining the video camera(s) of the aforementioned set or new set.

For instance, assume that the exterior is the selected monitored zone, querying the knowledge graph according to the present disclosure will allow to identify a set of video cameras comprising video cameras C1, C3 and C4.

Assuming that the exterior was selected because the operator wanted to track a moving object (such as a human) detected in this zone, it is possible to consider whether access control prevents the object from moving to certain monitored zones to identify the video camera(s) from the set and/or new set. For instance, assume the tracked person is not authorized to open the door D3 because they do not have the right to deactivate the access control reader A1, the computer may not recommend the video camera C4 since it is unlikely that this person will ever reach Room1 which is monitored by the video camera C4.

Should the person successfully authenticate themselves with the access control reader A1, the computer may then consider this access control request to identify the video camera(s) from the set and/or new set, and in this particular example identify the video camera C4 as a relevant video camera.

According to another example (not illustrated), assume that Room1 comprises a smoke alarm instead or in addition to the video camera C4. If a fire breaks out in Room1 (which fire can be considered as an activity of interest), the smoke alarm will go off and send a signal enabling to select Room1 as the selected monitored zone for purpose of querying the knowledge graph. As a result of the query, the knowledge graph will allow to identify a set of video cameras comprising video cameras C3, C1 and C2. The computer will then generate a video stream recommendation to the operator which can consist in any of the video cameras C3, C1, C2, but will preferably recommend them in this order which reflects a path that the fire would take should it spread across and out of the building.

According to the present disclosure, when a peripheral device sends a signal enabling to select the selected monitored zone (such as the smoke alarm mentioned above), this peripheral device does not need to be a video camera.

As explained above, the skilled person can optionally choose to limit the maximum number of video cameras in the set and/or new set to a certain number, which can be predetermined or based on the number of video cameras identified as a result of the query (or as a new query result when step 210 is repeated as explained above).

The computer will then generate a video stream recommendation based on the above-mentioned query result (or a new video stream recommendation based on the above-mentioned new query result). Continuing the example of the smoke alarm, this recommendation could include displaying a list of one or more of the video cameras C3, C1, C2 with hyperlinks towards their video streams. Alternatively, or in addition, this recommendation can include directly displaying or causing to display one or more video streams from the video cameras C3, C1, C2.

In a case where the video stream or new video stream recommendation comprises two or more video streams, it may be advantageous to rank the said two or more video streams so as to facilitate the operator's job. This ranking can be based on different criteria.

According to a non-illustrated example, the ranking can be made by weighing each edge of the knowledge graph based on a physical distance represented by that edge. In other words, it is possible to give more weight to certain edges which represent a longer distance. Assuming for instance that each wing of the corridor Cor3 has a length of ten meters (i.e. the corridor Cor3 has a total length of twenty meters), both the edge between the door D3 and the corridor Cor3 and the edge between the corridor Cor3 and the door D4 can be given the value ten. In the same way, assuming that corridor Cor1 has a length of ten meters, both the edge between the door D1 and the corridor Cor1 and the edge between the corridor Cor1 and the door D2 can be given the value five (i.e. half the length of the corridor Cor1), etc.

Alternatively, the ranking can be made by considering a dimension or geometry of each monitored zone. Such a dimension or geometry can be represented as a property of each ontology entity representing a monitored zone. In the present embodiment, these properties are represented in FIG. 4 in boxes similar to those of the ontology entities, see for instance the ten-meter box attached to the corridor Cor1, the eight-meter box attached to the corridor Cor2 and the twenty-meter box attached to the corridor Cor3. The knowledge graph further comprises labelled directed edges which link the different monitored and non-monitored zones to their respective properties, see for instance the edge linking the corridor Cor2 to the said eight-meter box which bears a label "has_length" indicating to the computer that this edge points to the length of the corridor Cor2. Similar edges bearing the label "has_length" link the corridors Cor1 and Cor3 to their respective length properties. Likewise, other labelled directed edges link the monitored zones to the peripheral devices which monitor them (edges bearing a label "monitored_by") and the peripheral devices to the monitored zones they belong to (edges bearing a label "located_in"), see for instance the edges linking the camera C1 to the corridor Cor1. The knowledge graph also comprises labelled directed edges which link the monitored zones, non-monitored zones and doors with one another, see the edges bearing the labels "leads_to_door" and "leads_to_zone" whose names are descriptive of the relationships they represent.

Note that the names of the labels preferably reflect the relationships they describe so that the graph is human readable, as in the present embodiment. However, this is not essential so long as the computer is configured to determine the meaning of these edges. Note also that the names of the labels given in the present embodiment are purely illustrative.

According to a non-illustrated example, the rankings may directly be represented as labels and/or properties of the edges which connect the monitored zones and the non-monitored zones with one another. In other words, the edges may comprise data and/or metadata representing labels and/or properties of the edges, such as the aforementioned rankings. The data and/or metadata may be represented above, over and/or below the edges.

According to the illustrated embodiment, the knowledge graph is in the form of a directed labelled graph. Note however that the edges may also be in the form of solid lines (i.e. undirected edges), so long as the computer is configured to determine the meaning of these edges. These undirected edges may also comprise data and/or metadata representing labels and/or properties thereof, similarly to what has been described above in relation to the directed edges. The data and/or metadata may here again be represented above, over and/or below the edges.

The aforementioned rankings reflect the fact that people generally walk at a certain speed and that certain video cameras will be reached at a later stage.

According to another alternative, the ranking can be based on previously displayed video stream recommendations for a selected monitored zone. For instance, in the above-mentioned example, assuming the operator has selected Room1 to look at a person in this room via the video camera C4, the computer will advantageously generate a video stream recommendation comprising at least the video stream provided by the video camera C3, since it is the video camera which was usually newly selected (i.e. by newly selecting corridor Cor2) after the monitored zone Room1 had been selected. Then, if the operator newly selects the monitored zone corridor Cor2, or alternatively the video stream from the video camera C3 corresponding to this monitored zone, the computer may rank the video camera C1 higher than the video camera C4 based on previously displayed video stream recommendations reflecting the assumption that the person is more likely to continue along the current direction rather than going back. In other words, this history of previously displayed video stream recommendations reflects which monitored zones were previously newly selected.

According to a preferred embodiment, the maximum number of video stream recommended in the video stream or new video stream recommendation can be set to a predetermined number so as not to clutter the operator's display. For instance, the recommendation or new recommendation can consist in a maximum of two video streams.

Alternatively, the maximum number of video stream recommended in the video stream or new video stream recommendation can be based at least in part on a number of monitored zones, a number of non-monitored zones, a number of peripheral devices, a number of video cameras and/or a number of possible paths in the physical area represented in the knowledge graph.

In other words, the maximum number of video stream recommended in the video stream or new video stream recommendation can be a function of different properties of the physical area under surveillance and/or of different properties pertaining to the peripheral devices.

The number of video streams displayed on the operator's display may vary upon selection of a video stream by the operator. For instance, video streams may initially be presented to the operator in a 3×3 or 4×4 grid view. Upon selection of a video stream by the operator in a 3×3 grid view, the four lower screens may be converted into a single screen showing the selected video stream, and the remaining 5 screens may be used (in full or in part) to show relevant video streams from the video stream or new video stream recommendation. Note that the choice of the layout (3×3, 4×4 etc.) may depend on the size of the operator's display.

The present disclosure further covers an apparatus for generating a video stream recommendation comprising at least one processor configured to carry out the method according to any one of the preceding examples or embodiments.

Advantageously, this apparatus can consist in an operator client 120 as described above or in a combination of different electronic devices, such as for instance an operator client 120, a management server 130 and a recording server 150 as described above.

In one embodiment, the knowledge graph is stored on the management server 130, and the set and new set of video cameras is sent to the operator client 120 for each query of the knowledge graph. Alternatively, the knowledge graph may be stored on the operator client 120. By storing the knowledge graph on the operator client 120, each operator client 120 does not need to communicate with the management server 130 for each query of the knowledge graph, which increases the operating speed and reduces network traffic.

If the operator has an interface which allows multiple video streams to be viewed simultaneously in different windows or on different screens, and the video stream or new video stream recommendations includes video streams relating to multiple video cameras, the computer can cause each of the windows or screens to show a view from a different one of the multiple video cameras. Thus, the operator can quickly view a plurality of video streams simultaneously.

The operator can then select the most relevant video stream view to be shown in the main window. Alternatively, the video streams might appear in equally sized windows, and then the operator can select one to switch to a full screen view. Alternatively, the operator might have multiple screens, and each video stream might appear on a different screen, in a full screen view.

It may be that the operator can view all of the video streams from the video stream or new video stream recommendation simultaneously. For example, if the computer generates a recommendation of N video streams, then when the operator enters a command, N windows are displayed, each showing a video stream from one of the video cameras from the video stream or new video stream recommendation. The operator can then select which video stream to view.

Even if the operator is currently only viewing a single video stream, in one embodiment, entering a command might switch the operator's display to a multiple window display showing a plurality of video streams from the video stream or new video stream recommendation, wherein the operator can then select one, and the display returns to displaying only the selected video stream. Therefore, in this embodiment, when the operator notices suspicious behaviour in a selected monitored zone, they can enter one command to immediately view all of the video streams of video cameras from the video stream or new video stream recommendation, and quickly select another view.

Thus, the various embodiments of the present disclosure allow an operator to quickly react when they notice a suspicious object or activity, and quickly find other video streams to continue monitoring the suspicious object or activity substantially continuously.

The invention claimed is:

1. A computer-implemented method of generating a video stream recommendation comprising:

identifying a plurality of peripheral devices monitoring zones of a physical area, the peripheral devices comprising a plurality of video cameras providing video streams of at least some of the monitored zones;

querying a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the querying; and generating a video stream recommendation based on the result of the querying.

2. The method according to claim 1, further comprising before the querying, receiving from one of the said peripheral devices a signal enabling to select the said selected monitored zone.

3. The method according to claim 1, further comprising before the querying, causing at least some of the said video streams to be displayed to a user and receiving a command from the user to select the said selected monitored zone by selecting a video stream of the said selected monitored zone.

4. The method according to claim 1, further comprising causing one or more video streams corresponding to the video stream recommendation to be displayed to the user.

5. The method according to claim 1, further comprising:
querying the knowledge graph in order to identify a new set of one or more video camera(s) monitoring zones other than a newly selected monitored zone from the video stream recommendation, as a new querying result;
generating a new video stream recommendation based on the new querying result.

6. The method according to the claim 5, further comprising receiving a new command from the user to select the said newly selected monitored zone by selecting a video stream of the said newly selected monitored zone.

7. The method according to claim 5, further comprising causing one or more video streams corresponding to the new video stream recommendation to be displayed to the user.

8. The method according to claim 1, wherein the knowledge graph further represents non-monitored zones of the physical area as ontology entities connected by edges, the said non-monitored zones being part of the said possible paths.

9. The method according to claim 5, wherein the selected and/or newly selected video stream(s) comprise a moving object.

10. The method according to claim 9, further comprising considering whether access control prevents the object from moving to certain monitored zones to identify the video camera(s) from the set and/or new set.

11. The method according to claim 9, further comprising considering access control requests made by or for the object to identify the video camera(s) from the set and/or new set.

12. The method according to claim 8, further comprising, in a case where at least one of the video stream recommendations comprises two or more video streams, ranking the said two or more video streams based on a number of edges between a monitored zone where the object is and the video cameras corresponding to the said two or more video streams.

13. The method according to claim 12, further comprising for the ranking weighing each edge based on a physical distance represented by that edge.

14. The method according to claim 12, further comprising for the ranking considering a dimension or geometry of each monitored zone.

15. The method according to claim 14, wherein the dimension or geometry of each monitored zone is represented as a property of each ontology entity representing a monitored zone.

16. The method according to claim 8, further comprising, in a case where at least one of the video stream recommendations comprises two or more video streams, ranking the said two or more video streams based on previously displayed video stream recommendations for a selected monitored zone.

17. The method according to claim 5, wherein a maximum number of video streams recommended in the video stream recommendation and/or new video stream recommendation is determined based at least in part on a number of monitored zones, a number of non-monitored zones, a number of peripheral devices, a number of video cameras and/or a number of possible paths in the physical area represented in the knowledge graph.

18. A non-transitory computer readable storage medium storing a program for causing a computer to execute a computer-implemented method of generating a video stream recommendation comprising:
identifying a plurality of peripheral devices monitoring zones of a physical area, the peripheral devices comprising a plurality of video cameras providing video streams of at least some of the monitored zones;
querying a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the querying; and
generating a video stream recommendation based on the result of the querying.

19. An apparatus for generating a video stream recommendation comprising at least one processor configured to:
identify a plurality of peripheral devices monitoring zones of a physical area, the peripheral devices comprising a plurality of video cameras providing video streams of at least some of the monitored zones;
query a knowledge graph representing the peripheral devices and the monitored zones as ontology entities connected by edges representing physical paths between the monitored zones, and by edges representing which monitored zones the peripheral devices monitor, in order to identify a set of one or more video camera(s) monitoring zones other than a selected monitored zone, as a result of the query;
generate a video stream recommendation based on the result of the query.

20. The apparatus according to claim 19, wherein the at least one processor is further configured to:
query the knowledge graph in order to identify a new set of one or more video camera(s) monitoring zones other than a newly selected monitored zone from the video stream recommendation, as a new query result;
generate a new video stream recommendation based on the new query result.

* * * * *